United States Patent
Wu et al.

(10) Patent No.: US 11,447,376 B2
(45) Date of Patent: Sep. 20, 2022

(54) COMBINED TRANSPORTER AND MASTER TRANSPORTER THEREOF

(71) Applicant: SHENZHEN YEE FUNG AUTOMATION TECHNOLOGY CO., LTD., Shenzhen (CN)

(72) Inventors: Hao Wu, Shenzhen (CN); Yi Qu, Shenzhen (CN); Yingjie Cai, Shenzhen (CN)

(73) Assignee: SHENZHEN YEE FUNG AUTOMATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/138,923

(22) Filed: Dec. 31, 2020

(65) Prior Publication Data

US 2021/0246003 A1 Aug. 12, 2021

Related U.S. Application Data

(63) Continuation of application No. PCT/CN2020/095883, filed on Jun. 12, 2020.

(30) Foreign Application Priority Data

Feb. 6, 2020 (CN) .......................... 202010081953.0

(51) Int. Cl.
 *B60P 3/08* (2006.01)
 *E04H 6/24* (2006.01)
 (Continued)

(52) U.S. Cl.
 CPC .................. *B66F 7/28* (2013.01); *B60P 3/07* (2013.01); *B60P 3/08* (2013.01); *E04H 6/24* (2013.01); *E04H 6/36* (2013.01)

(58) Field of Classification Search
 CPC .... E04H 6/18; E04H 6/22; E04H 6/24; E04H 6/36; B60P 3/08
 See application file for complete search history.

(56) References Cited

U.S. PATENT DOCUMENTS 5,009,559 A * 4/1991 Tsay .......................... E04H 6/22
 414/256
5,690,453 A 11/1997 Claps et al.
 (Continued)

FOREIGN PATENT DOCUMENTS

WO WO-2021009420 A1 * 1/2021

OTHER PUBLICATIONS

International search report,PCT/CN2020/0958838, dated Nov. 12, 2020 (8 pages).
(Continued)

*Primary Examiner* — Kaitlin S Joerger

(57) ABSTRACT

A combined transporter and a master transporter thereof are provided. The combined transporter includes a master transporter and a sub-transporter. The master transporter includes: a vehicle transferring cart, including a bottom support and two side supports connected to two opposite sides of the bottom support; an elevating assembly, configured on the bottom support and between the two side supports, wherein the elevating assembly is slidably connected to the two side supports, and the elevating assembly is configured to elevate up and down along a direction perpendicular to a main surface of the bottom support and limited by the two side supports. The sub-transporter is configured to move out of or move into the elevating assembly along a passage defined by the two side supports, and the sub-transporter is configured to transfer a vehicle between the elevating assembly and a parking spot.

18 Claims, 6 Drawing Sheets

(51) Int. Cl.
    *E04H 6/36*     (2006.01)
    *B66F 7/28*     (2006.01)
    *B60P 3/07*     (2006.01)

(56) References Cited

U.S. PATENT DOCUMENTS

| | | | |
|---|---|---|---|
| 11,214,976 B2* | 1/2022 | Cho | G08G 1/144 |
| 2005/0207876 A1* | 9/2005 | Springwater | E04H 6/24 |
| | | | 414/231 |
| 2020/0340263 A1* | 10/2020 | Cho | G08G 1/144 |
| 2021/0260765 A1* | 8/2021 | Cho | B66F 9/063 |

OTHER PUBLICATIONS

Hong Kong Short-Term Patent Search Report, 32020004517.9, dated Mar. 20, 2020 (9 pages).

* cited by examiner

COMBINED TRANSPORTER AND MASTER TRANSPORTER THEREOF

CROSS-REFERENCE TO RELATED APPLICATIONS

The present application is a continuation-application of the International (PCT) Patent Application No. PCT/CN2020/095883 filed on Jun. 12, 2020, which claims a foreign priority of the Chinese Patent Application No 202010081953.0, in the title of "transporter and sub-transporter", filed on Feb. 6, 2020 in the National Intellectual Property Administration of China, and the entire contents of which are incorporated in its entirety.

TECHNICAL FIELD

The present disclosure relates to the field of intelligent parking robots, and in particular to a combined transporter and a master transporter thereof.

BACKGROUND

With the development of the economy and the improvement of people's living conditions, an increasing number of people own cars for transporting. Therefore, the number of cars has exploded in recent years. However, the number of parking spots is limited in cities, resulting in difficulties for people to park.

In order to reduce the difficulties for park, in the related art, existing parking structures may be reconstructed to arrange multiple levels in the parking structure, such that the number of parking spots may be increased on the basis of the original parking structure. Reconstructing the overall parking structure mechanically by configuring an elevating apparatus to transport a vehicle to various levels may generate high costs and require a huge amount of construction. Therefore, a concise and efficient technical solution is required to transport the vehicle to the various levels.

SUMMARY OF THE DISCLOSURE

In a first aspect of the present disclosure, a combined transporter is provided and includes a master transporter and a sub-transporter, wherein the master transporter comprises a vehicle transferring cart and an elevating assembly. The vehicle transferring cart includes a bottom support and two side supports connected to two opposite sides of the bottom support. The elevating assembly is configured on the bottom support and between the two side supports, wherein the elevating assembly is slidably connected to the two side supports, and the elevating assembly is configured to elevate up and lower down along a direction perpendicular to a main surface of the bottom support and limited by the two side support. The main surface is a surface for supporting the elevating assembly. The sub-transporter is configured to move out of or move into the elevating assembly along a passage defined by the two side supports.

In a second aspect of the present disclosure, a master transporter, includes: a vehicle transferring cart, comprising a bottom support and two side supports connected to two opposite sides of the bottom support; an elevating assembly, configured on the bottom support and between the two side supports, wherein the elevating assembly is slidably connected to the two side supports, and the elevating assembly is configured to elevate up and lower down along a direction perpendicular to a main surface of the bottom support and limited by the two side supports.

BRIEF DESCRIPTION OF THE DRAWINGS

In order to further clearly illustrate embodiments of the present disclosure or technical solutions in the related art, accompanying drawings needed for describing the embodiments of the present disclosure and the technical solutions in the art may be introduced in brief. Obviously, the following drawings only show some embodiments of the present disclosure. Any ordinary skilled person in the art may acquire other drawings based on the following drawings without any creative work.

DETAILED DESCRIPTION

Technical solutions of the embodiments of the present disclosure will be clearly and comprehensively described by referring to accompanying drawings. Obviously, the embodiments to be described are only some of, but not all of, the embodiments of the present disclosure. Other embodiments may be obtained by any ordinary skilled person in the art based on the embodiments of the present disclosure without any creative work, and should be included in the scope of the present disclosure.

Terms "first", "second", and "third" in the embodiments of the present application are only used for descriptive purposes, and cannot be understood as indicating or implying relative importance or implicitly indicating the number of indicated technical features. Therefore, the features defined with "first", "second", and "third" may explicitly or implicitly include at least one of the features. In the description of the present disclosure, "a plurality of" means at least two, such as two, three, etc., unless otherwise specifically defined. In addition, terms "including", "having", and any variations thereof are intended to cover non-exclusive inclusion. For example, a process, a method, a system, a product, or a device that includes a series of operations or units is not limited to the listed operations or units, but alternatively includes unlisted operations or units, or alternatively includes other operations or units inherently included in the process, the method, the system, the product, and the device.

"Embodiments" mentioned in the present disclosure means that a specific feature, structure, or characteristic described in combination with the embodiments may be included in at least one embodiment of the present application. The appearance of the expression in various places in the specification does not necessarily refer to the same embodiment, nor is it an independent or alternative embodiment mutually exclusive with other embodiments. Ordinary skilled person in the art should clearly and implicitly understand that the embodiments described herein may be combined with other embodiments.

Figure 1:
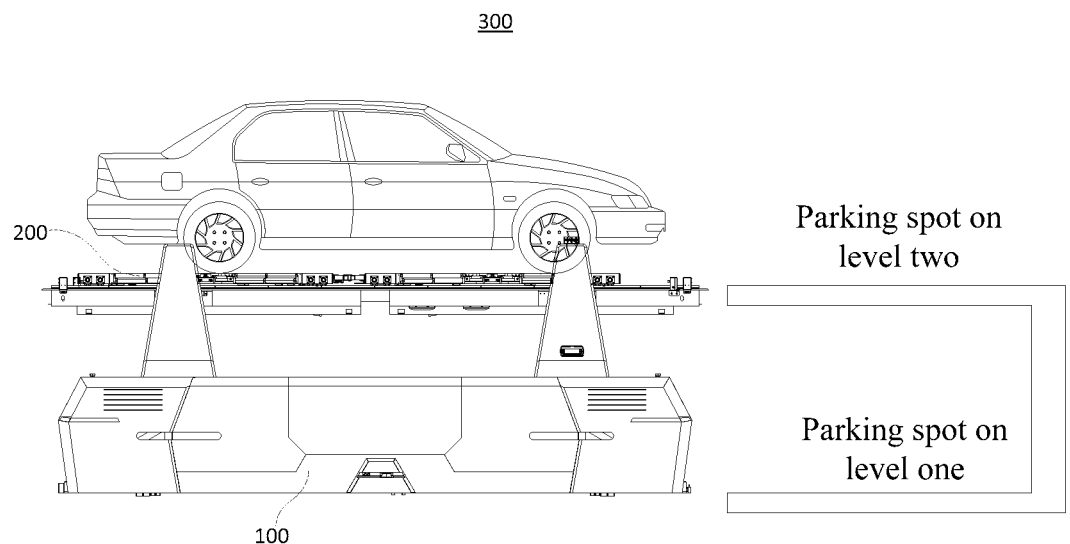
FIG. 1 is a structural schematic view of a combined transporter according to an embodiment of the present disclosure.
Figure 2:
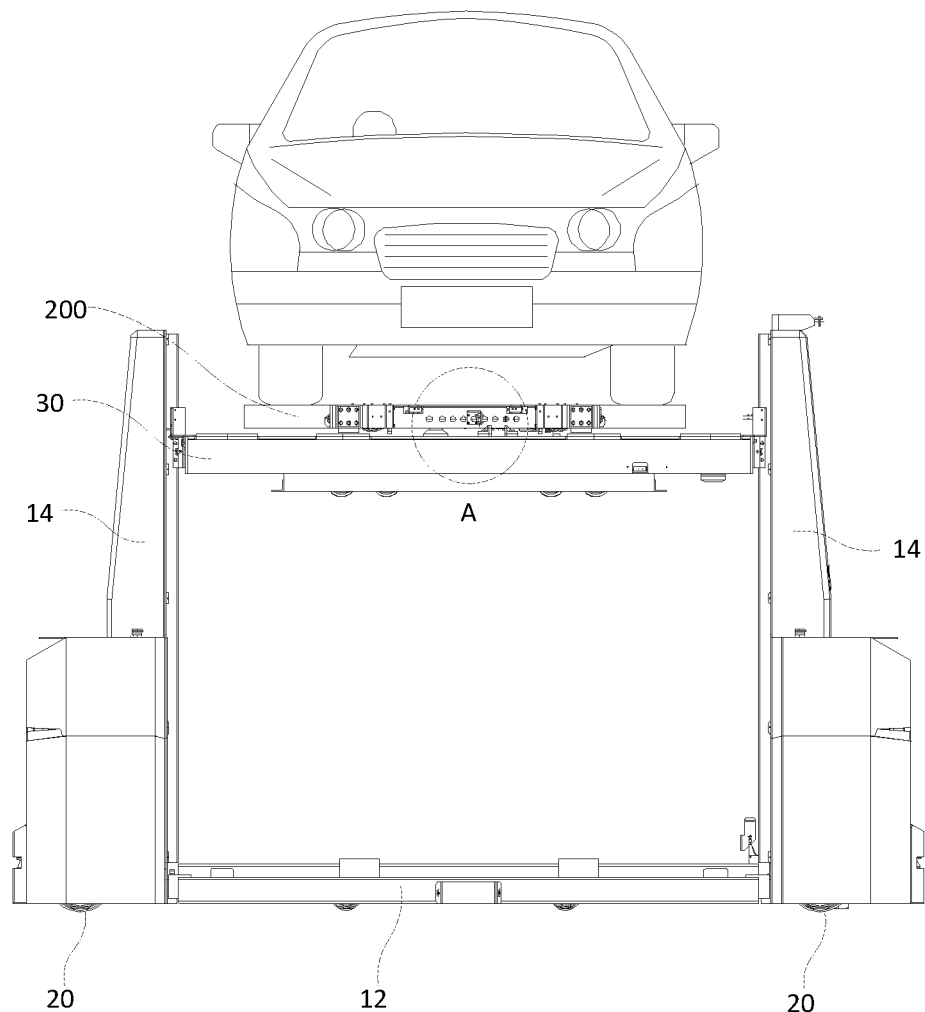
FIG. 2 is a front schematic view of the combined transporter shown in FIG. 1.
Figure 3:
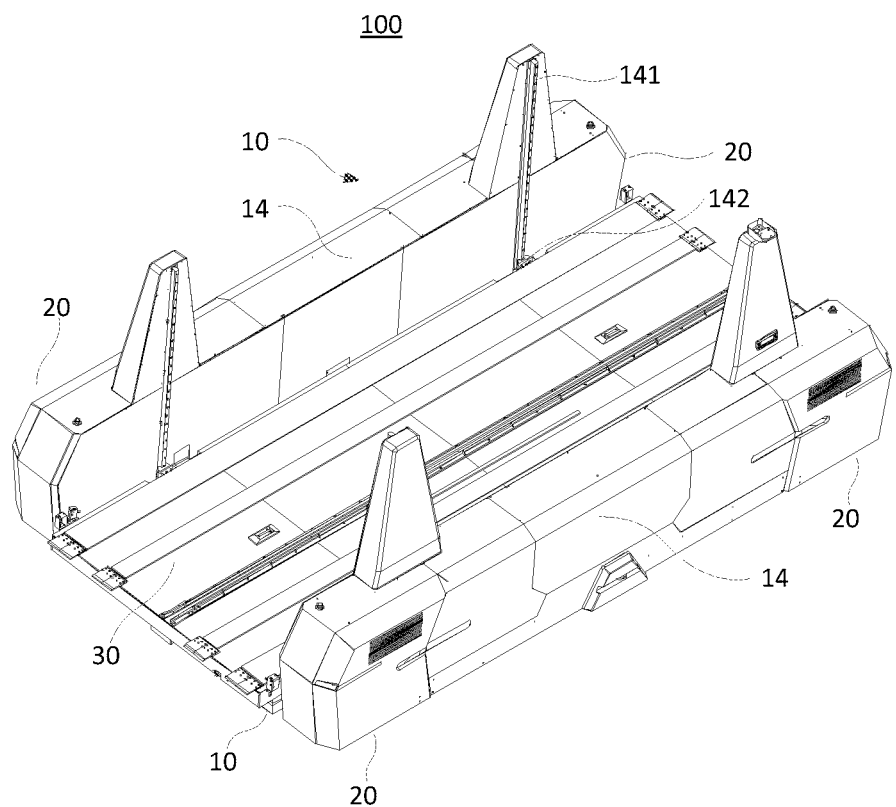
FIG. 3 is a structural schematic view of a master transporter shown in FIG. 1.
Figure 4:
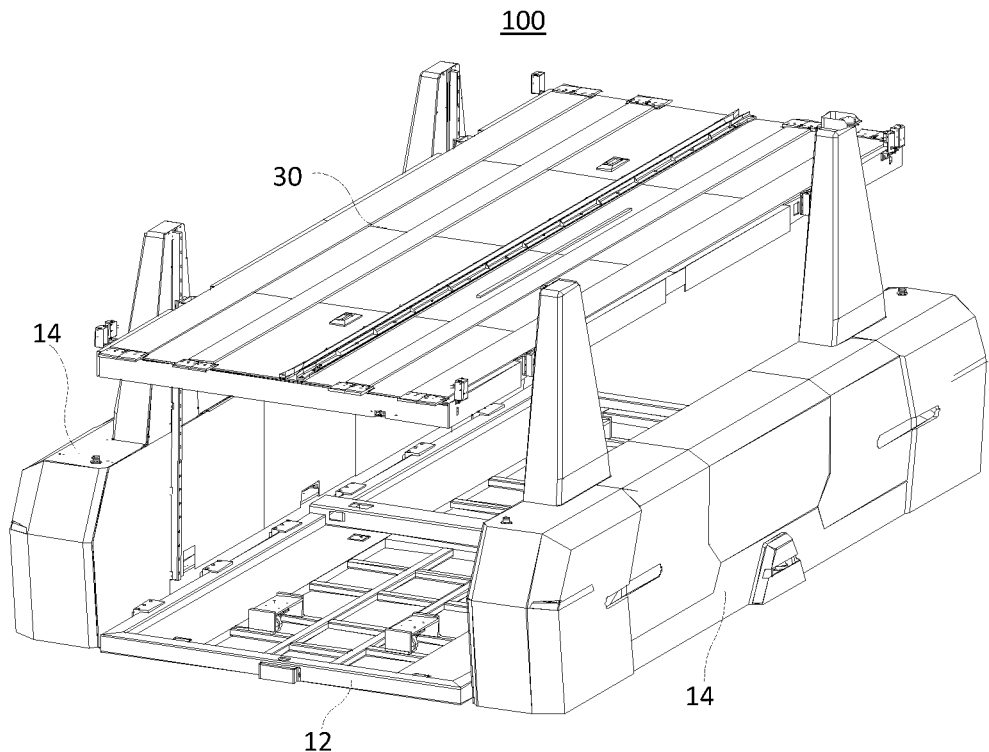
FIG. 4 is a structural schematic view of an elevating assembly of the master transporter shown in FIG. 3 after being elevated.

The present disclosure provides a combined transporter 300, referring to FIGS. 1 to 4. FIG. 1 is a structural schematic view of a combined transporter according to an embodiment of the present disclosure. FIG. 2 is a front schematic view of the combined transporter shown in FIG. 1. FIG. 3 is a structural schematic view of a master transporter shown in FIG. 1. FIG. 4 is a structural schematic view of an elevating assembly of the master transporter shown in FIG. 3 after being elevated.

The combined transporter 300 may be applied in an application scenario of a parking structure to transport a vehicle from a vehicle entry site of the parking structure to an appropriate parking spot of various levels of the parking structure and to transport a vehicle parking at a parking spot to a vehicle exit site of the parking structure.

The combined transporter 300 may include a master transporter 100 and a sub-transporter 200. The master transporter 100 may carry and transfer the sub-transporter 200. The master transporter 100 may align with the parking spot, and the sub-transporter 200 may be configured to transfer the vehicle between the parking sport and the master transporter.

The master transporter 100 may include a vehicle transferring cart 10, a plurality of moving mechanisms 20, and an elevating assembly 30. The plurality of moving mechanism 20 may be configured on the vehicle transferring cart 10 and configured to drive the vehicle transferring cart 10 to move. The sub-transporter 200 may be disposed on the elevating assembly 30. The elevating assembly 30 may be configured on the vehicle transferring cart 10 to move up and down to elevate and lower down the sub-transporter 200 disposed thereon, such that the vehicle carried by the sub-transporter 200 may be transferred to the parking spot at a high level of the parking structure.

As shown in FIG. 1 and FIG. 2, the master transporter 100 may carry and transport the sub-transporter 200 to the vehicle entry site of the parking structure. The sub-transporter 200 may carry the vehicle stopping at the vehicle entry site of the parking structure and transfer the vehicle to the master transporter 100. The master transporter 100 may move to an available parking sport in the parking structure. When the parking sport is at the higher level, the elevating assembly 30 may elevate to align with the parking spot at the higher level, and the sub-transporter 200 may transfer the carried vehicle to the parking sport at the higher level. Further, the unloaded sub-transporter 200 may return to the elevating assembly 30, and the master transporter 100 may transport another vehicle to be transported.

Figure 5:
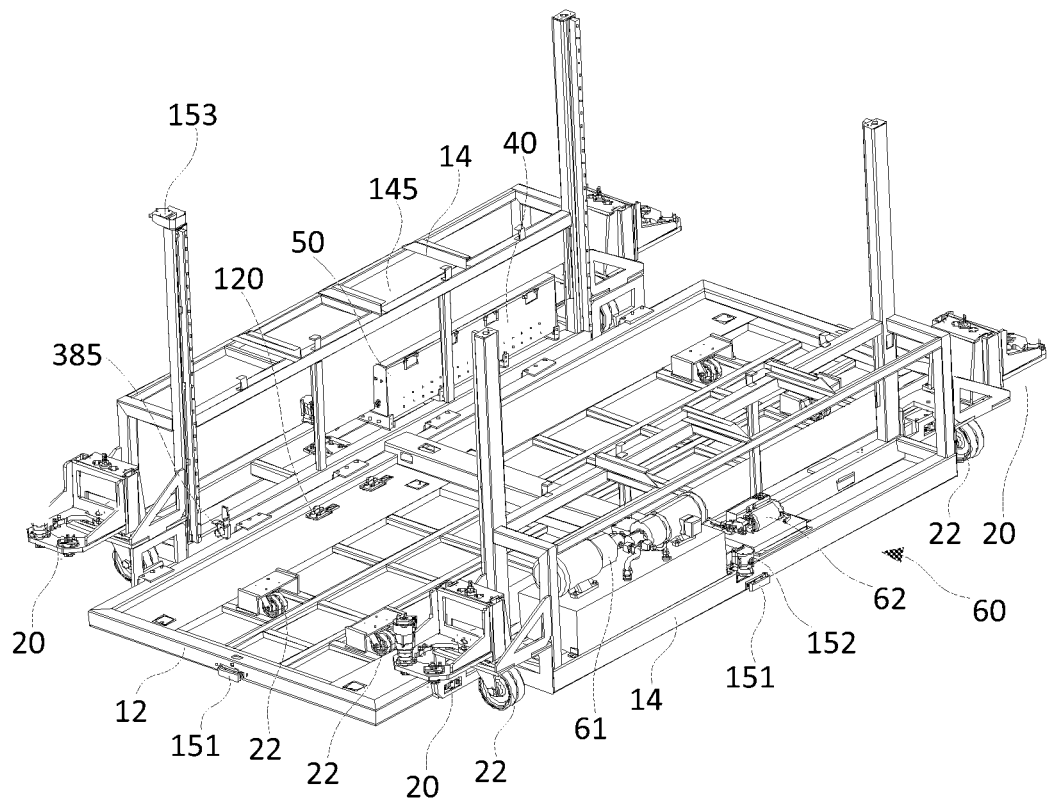
FIG. 5 is a structural schematic view of the master transporter shown in FIG. 3 by omitting the elevating assembly and a shell.

As shown in FIGS. 3 to 5, the vehicle transferring cart 10 may include a bottom support 12 and two side supports 14, and the two side supports are connected to two opposite sides of the bottom support 12.

The plurality of moving mechanisms 20 may at least be disposed at four corners of the vehicle transferring cart 10, and may be configured to drive the vehicle transferring cart 10 to move and to redirect the vehicle transferring cart 10 without changing a pose of the vehicle transferring cart 10. The plurality of moving mechanisms 20 may cooperate with each other to allow the vehicle transferring cart 10 to rotate around itself without displacing to adjust a direction to which a head of the carried vehicle faces.

Each of the plurality of moving mechanisms 20 may be an electric driving steering wheel. The electric driving steering wheel may be driven by its own and adjust a direction thereof. In this way, a plurality of electric driving steering wheels may cooperate with each other to redirect the vehicle transferring cart 10 without changing the pose of the vehicle transferring cart 10, and may enable the vehicle transferring cart 10 to rotate around itself without displacing.

Each of the plurality of moving mechanisms 20 may include a motor and a moving wheel. The motor may drive the moving wheel to rotate, and the plurality of moving mechanisms 20 may cooperatively drive the vehicle transferring cart 10 to move. The plurality of moving mechanisms 20 may rotate differentially to achieve redirection of the vehicle transferring cart 10.

Further, the master transporter 100 may include a plurality of load wheels 22. The plurality of load wheels 22 may be configured with the bottom support 12, and may also be disposed on a side of each of the two side supports 14 facing a support face (such as the ground). The load wheel 22 may be configured to support the vehicle transferring cart 10 while the vehicle transferring cart 10 is moving, and may share a support applied to the plurality of moving mechanisms 20. In this way, the support applied to the vehicle transferring cart 10 may be distributed more evenly, and the master transporter 100 may move more smoothly.

In the present embodiment, each of the plurality of load wheels 22 may be an omni-directional wheel. Each of the four corners of the bottom support 12 may be configured with one electrical driving steering wheel. Eight omni-directional wheels 22 may be configured with the bottom support 12. Four of the eight omni-directional wheels 22 may correspond to four electrical driving steering wheels, and the rest of the omni-directional wheels 22 may be disposed at a side of the bottom support 12 facing the support face.

The master transporter 100 may further include a plurality of distance detectors 151. The plurality of distance detectors 151 may be disposed at a periphery of the vehicle transferring cart 10, and configured to detect a distance between an obstacle and the master transporter 100. In this way, moving paths of the plurality of moving mechanisms 20 may be adjusted. Further the plurality of distance detectors 151 may be configured to detect a distance between the master transporter 100 and a corresponding parking spot, such that the master transporter 100 may align with the parking spot, and the distance between the master transporter 100 and the corresponding parking spot may be maintained appropriately, facilitating the sub-transporter 200 to load and unload the vehicle between the master transporter 100 and the parking sport.

The plurality of distance detectors 151 may be elements able to detect a distance, such as distance sensors, photoelectric sensors, and so on.

For example, along a path of the parking structure, a second combined transporter 300 may be loading or unloading a vehicle on the moving path of a first master transporter 100. When the plurality of distance detectors 151 of the first master transporter 100 detect a distance between the second combined transporter 300 in the front and the first master transporter as reaching a predefined distance, a signal may be generated to enable the first master transporter 100 to decelerate and move slowly, or enable the first master transporter 100 to reduce a speed to stop. Alternatively, when the plurality of distance detectors 151 detect an obstacle being located at a side of the moving path of the present master transporter and being too close to the first master transporter, having a risk of collision, another signal may be generated to drive the plurality of moving mechanisms 20 to redirect to change the moving path, avoiding the collision.

The master transporter 100 may further include at least two visual detectors 152. Each of the two side supports 14 is configured with at least one visual detector 152. The visual detectors are configured to detect spatial information in a front of the two side supports to adjust moving directions of the plurality of moving mechanisms 20.

The visual detectors 152 may be elements able to perform visual detection, such as visual sensors, laser sensors, and so on.

For example, along a path of the parking structure, the visual detectors 152 may detect spatial information along the moving direction. The spatial information may include a sign in front of the moving path, an obstacle on the moving path, and so on. For example, when a turning sign is located on the moving path, another master transporter 100 is located on the moving path, and so on, the visual detectors 152 may generate a signal to adjust the moving direction of the master transporter 100. In other words, the plurality of moving mechanisms 20 may be redirected at the same time to move by following a path or to avoid the obstacle.

The master transporter 100 may further include a laser positioning sensor 153. The laser positioning sensor 153 may be disposed on a top of each of the two side supports 14 away from the bottom support 12. The laser positioning sensor 153 may be configured to determine a location of the master transporter 100 while the master transporter 100 is cruising.

In the application scenario of the parking structure, paths of the parking structure, a location of the vehicle entry site, a location of a vehicle exit site, a location of each parking spot may be predefined. A scenario map of the parking structure may be stored in a control system of the master transporter 100. Therefore, in response to an instruction, the master transporter 100 may move along the path of the scenario map to move to a corresponding location. The laser positioning sensor 153 has a function of determining a location of the master transporter 100 in the scenario map. Therefore, the control system of the master transporter 100 may plan its own moving paths to achieve automatic cruising.

In this way, the plurality of distance detectors 151, the two visual detectors 152, and the laser positioning sensor 153 may work cooperatively to enable the master transporter 100 to automatically cruise in the parking structure and to adjust the moving path, such that the master transporter 100 may effectively transport vehicles.

As shown in FIG. 4, the elevating assembly 30 may be disposed on the bottom support 12 and between the two side supports 14. The elevating assembly 30 may be slidably connected to the two side supports 14. The elevating assembly 30 may elevate up and lower down along a direction perpendicular to a main surface of the bottom support 12 and limited by the two side supports 14. The main surface may be a surface of the bottom support 12 facing the vehicle.

The sub-transporter 200 may be disposed on the elevating assembly 30, and may depart away from or enter the elevating assembly 30 along a path defined by the two side supports 14.

As shown in FIG. 3, in the present embodiment, each of two sides of the two side supports 14 facing each other may be configured with a first guide element 141 respectively. The elevating assembly 30 may be configured with a second guide element 142 corresponding to the first guide element 141. The second guide element 142 may be slidably connected to the first guide element 141, such that the first elevating assembly 30 may elevate up and lower down along the first guide element 141, such that the elevating assembly 30 may elevate up and down more smoothly.

The first guide element 141 may be a guide rail, and the second guide element may be a slide block. Alternatively, the first guide element 141 may be a guide shaft, and the second guide element 142 may be a guide block. The guide block may be slidably connected to the guide shaft.

In other embodiments, each of the two side supports 14 may be configured with a lifting mechanism, and the lifting mechanism may be configured to drive an entirety of the elevating assembly 30 to elevate up and lower down. In detail, after the elevating assembly 30 elevates to a certain altitude, the lifting mechanism may start working to drive the elevating assembly 30 to further elevate up, such that the master transporter 100 may elevate the sub-transporter 200 up and lower the sub-transporter 200 down twice, and an altitude that the sub-transporter 200 is able to reach may be increased.

The lifting mechanism may be a servo electric cylinder or a hydraulic cylinder. For example, each of the two sides of the two side supports 14 facing each other may be configured with two servo electric cylinders. A driving end of each of the two servo electric cylinders may be connected to the elevating assembly 30, and four servo electric cylinders may cooperatively lift the elevating assembly 30.

Figure 6:
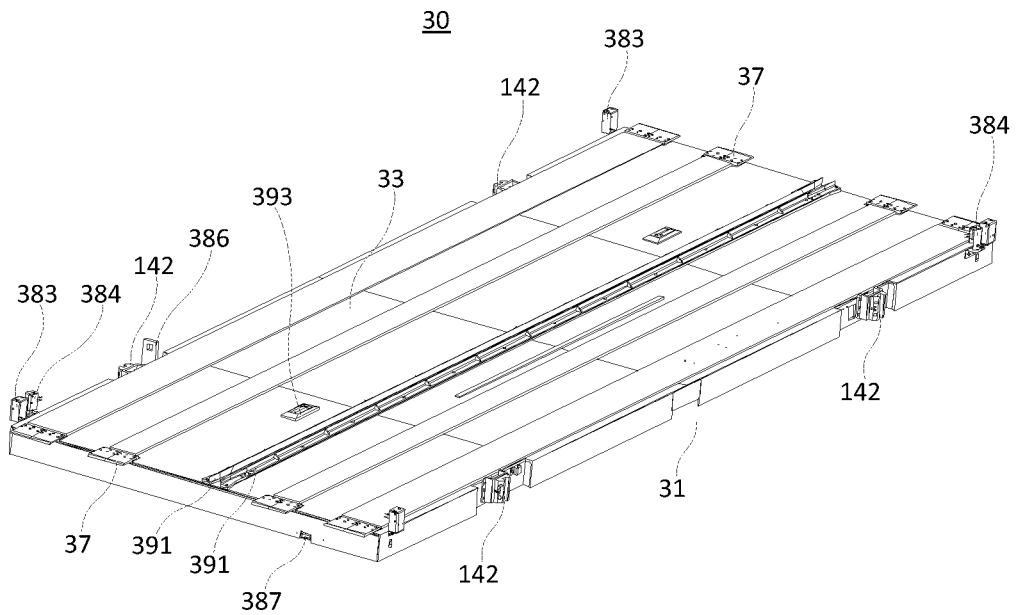
FIG. 6 is a structural schematic view of the elevating assembly shown in FIG. 3 in an overlapped and stacked state.
Figure 7:
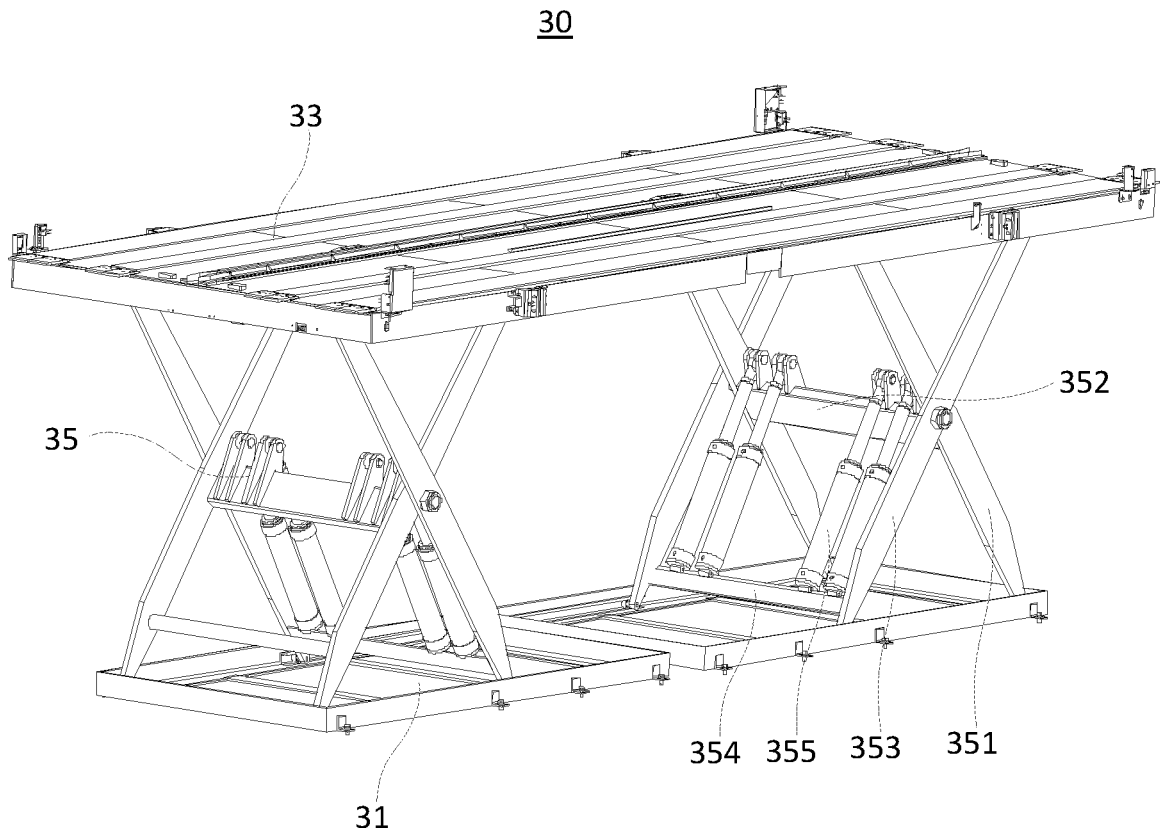
FIG. 7 is a structural schematic view of the elevating assembly shown in FIG. 3 in a separated state.

In the present embodiment, as shown in FIG. 6 and FIG. 7, FIG. 6 is a structural schematic view of the elevating assembly shown in FIG. 3 in an overlapped and stacked state, and FIG. 7 is a structural schematic view of the elevating assembly shown in FIG. 3 in a separated state. The elevating assembly 30 may include a base board 31, a vehicle carrying board 33, and an elevating mechanism 35.

The base board 31 may be disposed on the bottom support 12. For example, the base board 31 and the bottom support 12 may be stacked and connected via a fastening element. The vehicle carrying board 33 and the base board 31 may be stacked, and the vehicle carrying board 33 may be configured to carry the sub-transporter 200. The vehicle carrying board 33 may be stacked on the base board 31 and contact the base board 31. The elevating mechanism 35 may be disposed between the base board 31 and the vehicle carrying board 33, and may be configured to drive the vehicle carrying board 33 to move away from the base board 31, such that a state of the vehicle carrying board 33 and the base board 31 being stacked and contacting each other may be changed into a state of the vehicle carrying board 33 and the base board 31 being separated. Further, the elevating mechanism 35 may be configured to drive the vehicle carrying board 33 to move towards the base board 31, such that the state of the vehicle carrying board 33 and the base board 31 being separated may be changed into the state of the vehicle carrying board 33 and the base board 31 being stacked and contacting each other.

The elevating mechanism 35 may include a first foldable shelf 351, a second foldable shelf 353, and a driving mechanism 355. A first end of the first foldable shelf 351 may be hinged to the base board 31, and a second end of the first foldable shelf 351 may slidably support the vehicle carrying board 33. A first end of the second foldable support 353 may be hinged to the vehicle carrying board 33, and a second end of the second foldable shelf 353 may be slidably supported on the base board 31. A middle portion of the first foldable shelf 351 and a middle portion of the second foldable shelf 353 may be hinged. The driving mechanism 355 may be configured to change an intersection angle between the first foldable shelf 351 and the second foldable shelf 353. The intersection angle may be an angle between the first foldable shelf 351 and the second foldable shelf 353 at which the first foldable shelf 351 and the second foldable shelf 353 are hinged. A change of the intersection angle may drive the vehicle carrying board 33 to be elevated up and down relative to the base board 33.

In the present embodiment, the driving mechanism 355 may be a retractable rod. An end of the retractable rod may be hinged to the first foldable shelf 351, and the other end of the retractable rod may be hinged to the second foldable shelf 353. The retractable rod may be extended and retracted to change the intersection angle between the first foldable shelf 351 and the second foldable shelf 353.

The retractable rod may be a hydraulic retractable rod driven by a hydraulic pressure. Alternatively, the retractable rod may be a pneumatic retractable rod driven by a pneumatic pressure. The present disclosure does not limit a type of the retractable rod.

In some embodiments, an end of the retractable rod may be hinged to the first foldable shelf 351, and the other end of the retractable rod may be hinged to the base board 31. Alternatively, an end of the retractable rod may be hinged to the second foldable shelf 353, and the other end of the retractable rod may be hinged to the vehicle carrying board 33.

In some embodiments, the driving mechanism 355 may be a motor and a chain. The motor may drive the second end of the second foldable shelf 353 to slide on the base board 33 through the chain, such that the intersection angle may be changed to drive the vehicle carrying board 33 to elevate up and down relative to the base board 33. The driving mechanisms 355 may also be in other types, which will not be limited by the present disclosure.

There may be only one elevating mechanism 35 disposed. The only one elevating mechanism 35 may be connected to a middle portion of the base board 31 and a middle portion of the vehicle carrying board 33, such that the vehicle carrying board 33 may be elevated up and down stably.

Alternatively, two elevating mechanisms 35 may be disposed. A first support beam 352 may be connected between two first foldable shelves 351 of the two elevating mechanisms 35. A second support beam 354 may be connected between two second foldable shelves 351 of the two elevating mechanisms 35. A retracting end of the retractable rod may be hinged to the first support beam 352, and a driving end of the retractable rod may be hinged to the second support beam 354. The retractable rod may be extended and retracted to change the intersection angle between the first foldable shelf 351 and the second foldable shelf 352 of each of the two elevating mechanisms 35 at the same time. The two elevating mechanisms 35 may be disposed along a spacing direction of the two side supports 14, and the spacing direction may be perpendicular to a direction along which the sub-transporter 200 moves away or enters the elevating assembly 30, such that the vehicle carrying board 33 may be elevated up and lowered down more smoothly.

The first support beam 352, the second support beam 354, and the retractable rod may not be disposed on a same plane, so as to avoid the first support beam 352, the second support beam 354, and the retractable rod from being locked with each other. For example, a hinge base may be configured on the first support beam 352. The retracting end of the retractable rod may be hinged to the hinge base. An angle between the retracting end of the retractable rod and the hinge base may not be 180°. In this way, in response to the retractable rode being extended and retracted, the intersection angle between the first foldable shelf 351 and the second foldable shelf 353 may be changed.

In the present embodiment, four elevating mechanisms 35 may be configured. Every two of the four elevating mechanisms 35 may be disposed along the spacing direction, and every two of the four elevating mechanisms 35 may be disposed at two opposite ends of the vehicle carrying board 33. The vehicle carrying board 33 may be elevated up and lowered down more smoothly.

Figure 8:
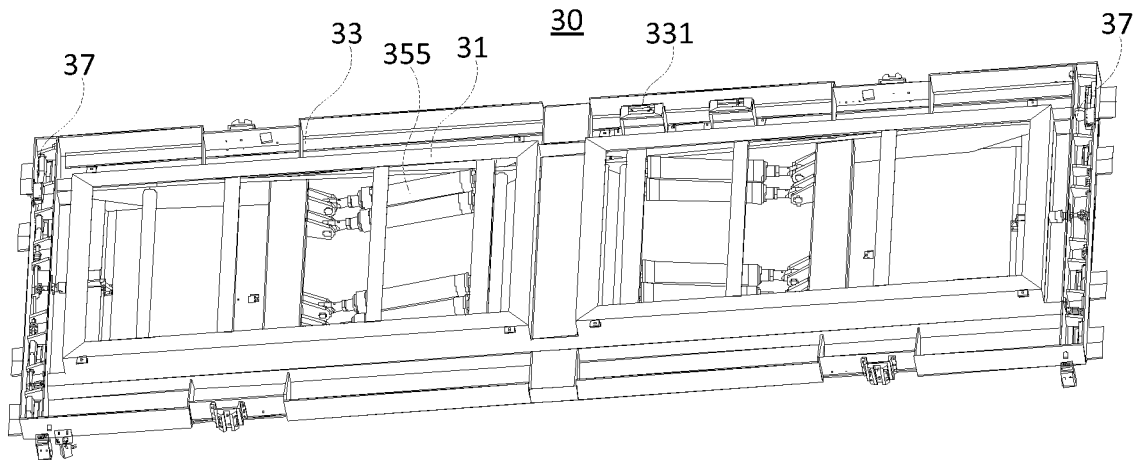
FIG. 8 is a bottom view of the elevating assembly shown in FIG. 6.
Figure 9:
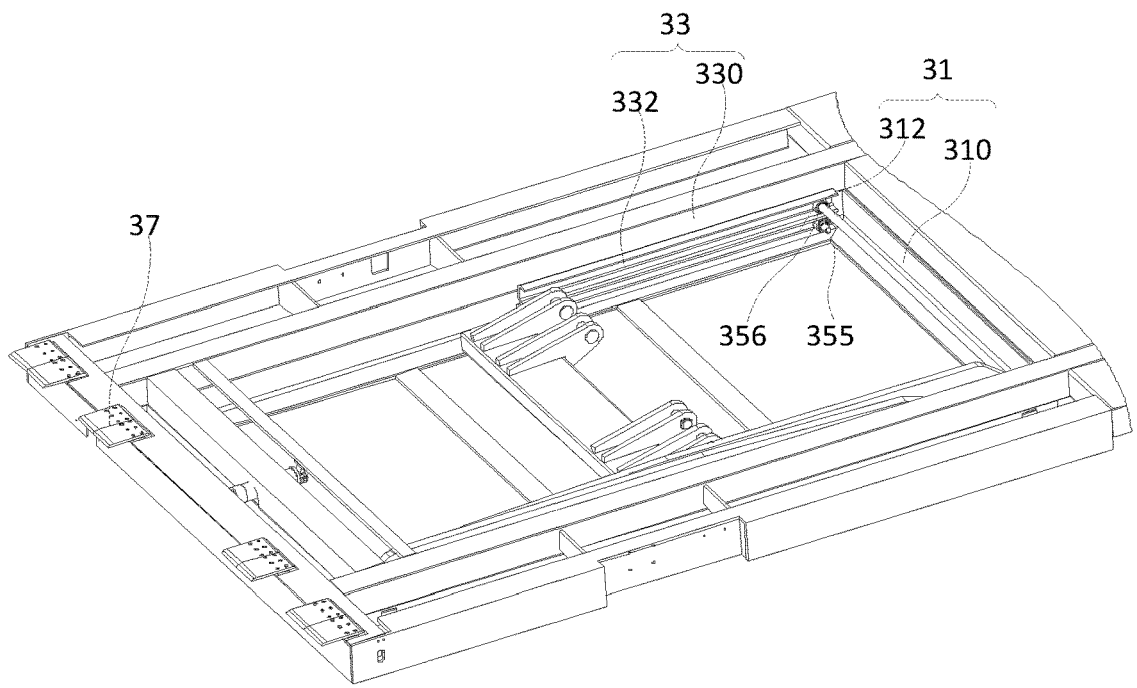
FIG. 9 is an enlarged view of a portion of the elevating assembly shown in FIG. 6.

As shown in FIG. 8 and FIG. 9, FIG. 8 is a bottom view of the elevating assembly shown in FIG. 6, and FIG. 9 is an enlarged view of a portion of the elevating assembly shown in FIG. 6. The base board 31 may include a first frame 310 and two first slide guiding elements 312, and the two first slide guiding elements 312 may be disposed at two opposite inner sides of the first frame 310. The vehicle carrying board 33 may include a second frame 330 and two second slide guiding elements 332, and the two second slide guiding elements 332 may be disposed at two opposite inner sides of the second frame 330. A first sliding element 357 may be rotatably connected to each of an inner side and an outer side of the second end of the first foldable shelf 351. A second sliding element 356 may be rotatably connected to each of an inner side and an outer side of the second end of the second foldable shelf 353. The first sliding element 357 may be slidably connected to the first slide guiding element 312 correspondingly. The second sliding element 356 may be slidably connected to the second slide guiding element 332 correspondingly. The second frame 330 may be stacked with or separated from the first frame 310.

In other words, in response to the intersection angle between the first foldable shelf 351 and the second foldable shelf 353 being changed, the first sliding element 357 may be guided by the first slide guiding element 312 to slide, and the second sliding element 356 may be guided by the second slide guiding element 332 to slide. In this way, the vehicle carrying board 33 may elevate up and lower down relative to the base board 31 more smoothly.

Figure 10:
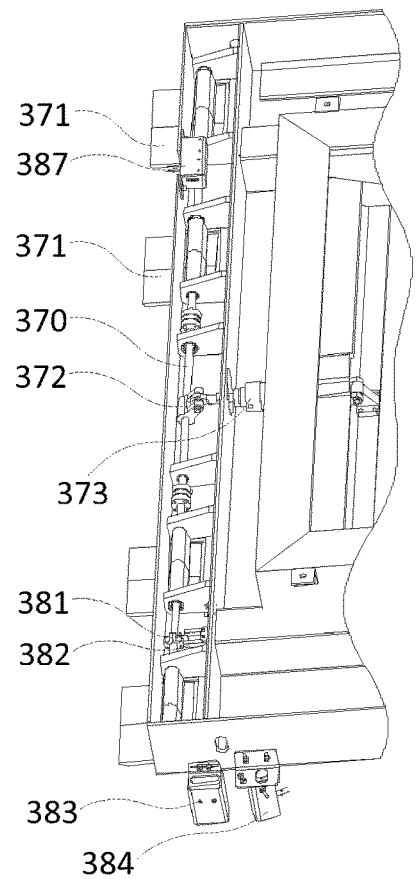
FIG. 10 is an enlarged view of a portion of the elevating assembly shown in FIG. 8.

As shown in FIG. 10, FIG. 10 is an enlarged view of a portion of the elevating assembly shown in FIG. 8. The elevating assembly 30 may further include a bridging mechanism 37, disposed at an end portion of the vehicle carrying board 33, serving as a bridge between the vehicle carrying board 33 and the parking spot for the sub-transporter 200 to pass through.

The bridging mechanism 37 may include a rotating shaft 370, a plurality of pedals 371, a swinging member 372, and a pushing rod 373.

The rotating shaft 370 may be rotatably configured on the vehicle carrying board 33. The plurality of pedals 371 may be fixedly connected to the rotating shaft 370. The plurality of pedals 371 may be configured to form the bridge between the vehicle carrying board 33 and the parking spot for the sub-transporter 200 to pass through. The swinging member 372 may be fixedly connected to the rotating shaft 370. Two ends of the pushing rod 373 may be hinged to the swinging member 372 and the vehicle carrying board 33 respectively.

The pushing rod 373 may drive the swinging member 372 to swing around an axis of the rotating shaft 370 to drive the plurality of pedals 371 to swing around the axis of the rotating shaft 370, such that the plurality of pedals 371 may be driven to rotate to form the bridge connected to the parking spot, or the bridge formed by the plurality of pedals 371 may be driven to be received from the parking spot.

The pushing rod 373 may be a hydraulic pushing rod or a pneumatic pushing rod. The pushing rod 373 may be extended and retracted to drive the swinging member 372 to swing around the axis of the rotating shaft 370.

Further, as shown in FIG. 6 and FIG. 10, the vehicle carrying board 33 may be connected to a first photocoupler 381. The rotating shaft 370 may be fixedly connected to a sensing sheet 382. When the sensing sheet 382 rotates along with the rotating shaft 370 till being sensed by the first photocoupler 381, the pushing rod 373 may stop driving the swinging member 372 to rotate, and the plurality of pedals may extend to be coplanar with the vehicle carrying board 33 to bridge to the parking spot.

A side of the vehicle carrying board 33 away from the base board 31 may be configured with a second photocoupler 383 and a third photocoupler 384. The second photocoupler 383 may be disposed at an end of the vehicle carrying board 33, and configured to detect the sub-transporter 200 driving out of or driving into the vehicle carrying board 33. The third photocoupler 384 may be disposed along a diagonal line of the vehicle carrying board 33, and configured to detect whether the sub-transporter 200 is carried on the vehicle carrying board 33.

In detail, the second photocoupler 383 may be configured at each of an end portion of the vehicle carrying board 33 for the sub-transporter 200 to move in and an end portion of the vehicle carrying board 33 for the sub-transporter 200 to move out. In this way, the sub-transporter 200 moving in and out of the vehicle carrying board 33 may be detected. The third photocoupler 384 disposed along the diagonal line of the vehicle carrying board 33 may be understood as a detection light of the third photocoupler 384 being emitted along the diagonal line of the vehicle carrying board 33. In this way, the third photocoupler 384 may detect the sub-transporter 200 being carried on the vehicle carrying board 33.

As shown in FIG. 5 and FIG. 6, the second guide element 142 may be disposed at each of two side edges of the vehicle carrying board 33. The second guide element 142 may be slidably connected to the first guide element 141. Further, a wiring encoder 385 may be connected to the bottom support 12, and a wiring base 386 may be connected to the vehicle carrying board 33. A wire of the wiring encoder 385 may be connected to the wiring base 386. The wiring encoder 385 may be configured to detect an altitude of the vehicle carrying board 33, such that the vehicle carrying board 33 may be prevented from elevating to a height exceeding a maximal altitude of the first guide element 141, and the altitude of the vehicle carrying board 33 relative to the base board 31 may be detected in real-time, ensuring accuracy of the altitude of the vehicle carrying board 33.

The vehicle carrying board 33 may be configured with an aligning sensor 387 configured to enable the vehicle carrying board 33 to align with the parking spot. In other words, the aligning sensor 387 may detect the altitude of the vehicle carrying board 33 and the altitude of the parking spot, and determine whether the vehicle carrying board 33 aligns with the parking spot by comparing the altitude of the vehicle carrying board 33 and the altitude of the parking spot. In response to the vehicle carrying board 33 not aligning with the parking spot, the altitude of the vehicle carrying board 33 may further be adjusted. In response to the vehicle carrying board 33 aligning with the parking spot, the plurality of pedals 371 may be controlled to bridge to the parking sport, such that the sub-transporter 200 may transfer the vehicle between the parking spot and the master transporter 100. That is, the aligning sensor 387 may be configured to further ensure the vehicle carrying board 33 to align with the parking sport.

Figure 11:
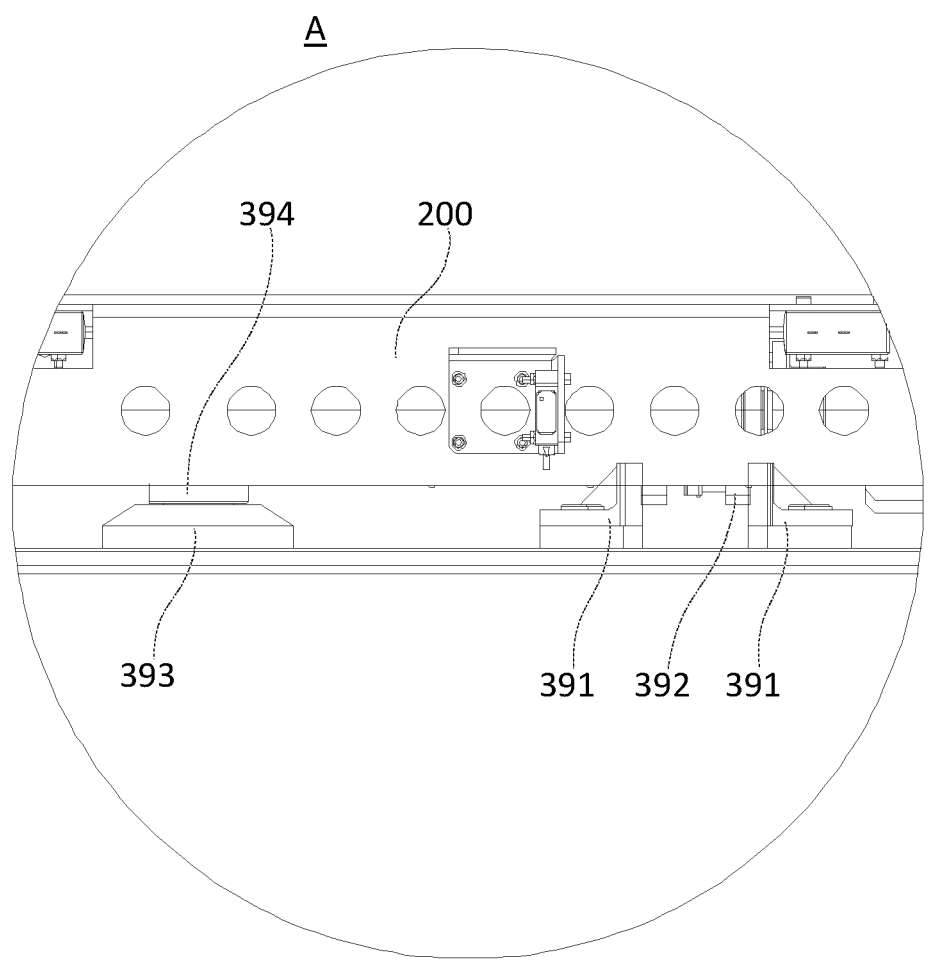
FIG. 11 is an enlarged view of a portion A of the combined transporter shown in FIG. 2.

As shown in FIG. 2 and FIG. 11, the side of the vehicle carrying board 33 away from the base board 31 may be configured with two sub-transporter guide rails 391 spaced apart from each other. A side of the sub-transporter 200 facing the vehicle carrying board 33 may be configured with a sub-transporter guide wheel 392. The sub-transporter guide wheel 392 may be configured to engage with the sub-transporter guide rail 391 by rolling between the two sub-transporter guide rails 391 to correct a moving patch of the sub-transporter 200, such that the vehicle carried by the sub-transporter may be prevented from impacting the side supports 14.

Further, the side of the vehicle carrying board 33 away from the base board 31 may be configured with a sub-transporter positioning member 393. The side of the sub-transporter 200 facing the vehicle carrying board 33 may be configured with a sub-transporter positioning base 394. The sub-transporter positioning member 393 may be configured to sense the sub-transporter positioning base 394 to position the sub-transporter 200.

Further, as shown in FIG. 5, FIG. 8, and FIG. 11, the master transporter 100 may further include a battery 40 for supplying power. The side support 14 may be configured with the battery 40. The bottom support 12 may be configured with a first recharging connector 120. The battery may supply power to the first recharging connector 120. The vehicle carrying board 33 may be configured with a second recharging connector 331 facing the bottom support 12. The side of the vehicle carrying board 33 away from the base board 31 may be configured with the sub-transporter positioning member 393. The sub-transporter positioning member 393 may be electrically connected to the second recharging connector 331. The side of the sub-transporter 200 facing the vehicle carrying board 33 may be configured with the sub-transporter positioning base 394, and the sub-transporter positioning base 394 may be configured to electrically connect to the sub-transporter positioning member 393. Therefore, when the sub-transporter positioning base 394 is conducted to the sub-transporter positioning member 393, the sub-transporter 200 may be determined as being positioned at a predefined position on the master transporter 100, such that the sub-transporter 200 may be stopped from moving.

When the vehicle carrying board 33 is stacked on the base board 31, the second recharging connector 331 may be electrically connected to the first recharging connector 120. When the sub-transporter 200 is guided by the sub-transporter guide rail 391, the sub-transporter positioning base 394 may be electrically connected to the sub-transporter positioning member 393. In this way, the position of the sub-transporter 200 may be determined and may be stopped from moving.

As shown in FIG. 5, the master transporter 100 may further include a control system 50 configured to control movement of the vehicle transferring cart 10 and elevation of the elevating assembly 30. Each of the distance detector 151, the visual sensor 152, the laser positioning sensor 153, the first photocoupler 381, the second photocoupler 383, the third photocoupler 384, the aligning sensor 387, and the wiring encoder 385 may be communicatively connected to the control system 50. Further, the control system 50 may be communicatively connected to the moving mechanism 20 and the elevating assembly 30. The control system 50 may be configured to receive data collected by the above-mentioned elements and process the collected data, and generate a control instruction based on a processing result to control the movement of the master transporter 100 and control the vehicle carrying board 33 to elevate up and lower down.

The master transporter 100 may further include a power source 60 configured to provide power to the driving mechanism 355 and the pushing rod 373. For example, when the driving mechanism 355 is the hydraulic retractable rod driven by the hydraulic pressure, and the pushing rod 373 is driven by the hydraulic pressure, the power source 60 may be a hydraulic pump. Alternatively, when the driving mechanism 355 is the pneumatic retractable rod driven by the pneumatic pressure, and the pushing rod 373 is driven by the pneumatic pressure, the power source 60 may be a pneumatic pump. In other words, the power source 60 may provide power needed by the driving mechanism 355 and the pushing rod 373.

The power source 60 may further include a first power source 61 and a second power source 62. The first power source 61 may provide power to the driving mechanism 355, and the second power source 62 may provide power to the pushing rod 373.

Each of the two side supports 14 may define a receiving space 145. The battery 40, the control system 50, and the power source 60 may be received in the receiving space 145. For example, the battery 40 and the control system 50 may be received in the receiving space 145 defined in one of the two side supports 14, and the power source 60 may be received in the receiving space 145 defined in the other one of the two side supports 14.

Further, various electrical elements and cables may be received in the receiving space, such that various components of the master transporter 100 may be disposed regularly and compactly.

According to the present disclosure, a combined transporter is provided. The combined transporter includes a sub-transporter and a master transporter. The master transporter includes a vehicle transferring cart and an elevating assembly. The sub-transporter is configured to transfer the vehicle between the parking sport and the elevating assembly. When the vehicle is required to be transported to a parking spot at a higher level, the elevating assembly may be elevated along a direction perpendicular to a main surface of the bottom support and limited by side supports. After the vehicle is elevated to a position aligning with the parking spot at the higher level, the sub-transport may transfer the carried vehicle to the parking sport at the higher level. Therefore, the combined transporter according to the present disclosure may easily and efficiently transfer the vehicle to various parking spots at various levels. In this way, transporting the vehicle to higher levels may be achieved, whereas mechanically reconstructing the parking structure causing high costs and the huge amount of construction may be avoided.

The above description only illustrates examples of the present disclosure, but does not limit the scope of the present disclosure. Any equivalent structural or equivalent process transformation performed based on the specification and drawings of the present disclosure, directly or indirectly applied to other related art, should also be included in the scope of the present disclosure.

What is claimed is:

1. A combined transporter, comprising a master transporter and a sub-transporter, wherein the master transporter comprises:
   a vehicle transferring cart, comprising a bottom support and two side supports connected to two opposite sides of the bottom support;
   an elevating assembly, configured on the bottom support and between the two side supports, wherein the elevating assembly is slidably connected to the two side supports, and the elevating assembly is configured to elevate up and lower down along a direction perpendicular to a main surface of the bottom support and limited by the two side supports, the main surface is a surface for supporting the elevating assembly;
   wherein the sub-transporter is configured to move out of or move into the elevating assembly along a passage defined by the two side supports, and the sub-transporter is configured to transfer a vehicle between the elevating assembly and a parking spot,
   Wherein a side of the elevating assembly away from the bottom support is configured with two sub-transporter guide rails, the two sub-transporter guide rails are spaced apart from each other;
   a side of the sub-transporter facing the elevating assembly is configured with a sub-transporter guide wheel; and
   the sub-transporter guide wheel is configured to engage with each of the two sub-transporter guide rails to correct the sub-transporter.

2. The combined transporter according to claim 1, wherein the side of the elevating assembly away from the bottom support is configured with a sub-transporter positioning element, and the sub-transporter positioning member is configured to position the sub-transporter by being corrected by the two sub-transporter guide rails.

3. The combined transporter according to claim 1, wherein the elevating assembly comprises:
   a base board, disposed on the bottom support;
   a vehicle carrying board, stacked on the base board and configured to carry the sub-transporter; and
   an elevating mechanism, disposed between the base board and the vehicle carrying board;
   wherein the elevating mechanism comprises:
   a first foldable shelf, wherein a first end of the first foldable shelf is hinged to the base board, and a second end of the first foldable shelf is configured to slidably connect to the vehicle carrying board to support the vehicle carrying board;
   a second foldable shelf, wherein a first end of the second foldable shelf is hinged to the vehicle carrying board, and a second end of the second foldable shelf is configured to slidably connect to the base board and supported by the base board; and
   a driving mechanism, configured to change an intersection angle between the first foldable shelf and the second foldable shelf to drive the vehicle carrying board to elevate up and lower down relative to the base board.

4. The combined transporter according to claim 3, wherein the driving mechanism is a retractable rod, an end of the retractable rod is hinged to the first foldable shelf, the other end of the retractable rod is hinged to the second foldable shelf, and the retractable rod is extended and retracted to change the intersection angle between the first foldable shelf and the second foldable shelf.

5. The combined transporter according to claim 3, wherein
- each of two sides of the two side supports facing each other is configured with a first guide element;
- the vehicle carrying board is configured with a second guide element corresponding to the first guide element;
- the second guide element is slidably connected to the first guide element; and
- the vehicle carrying board is configured to elevate up and lower down along an extending direction of the first guide element, the extending direction of the first guide element is perpendicular to the main surface of the bottom support.

6. The combined transporter according to claim 3, wherein the elevating assembly further comprises a bridging mechanism configured at an end portion of the vehicle carrying board, and the bridging mechanism comprises:
- a rotating shaft, disposed on and rotatably connected to the vehicle carrying board;
- a plurality of pedals, fixedly connected to the rotating shaft and configured to form a bridge between the vehicle carrying board and the parking sport;
- a swinging member, fixedly connected to the rotating shaft; and
- a pushing rod, wherein two ends of the pushing rod are hinged to the swinging member and the vehicle carrying board respectively;
- wherein the pushing road is configured to drive the swinging member to rotate around an axis of the rotating shaft to drive the plurality of pedals to rotate around the axis of the rotating shaft.

7. The combined transporter according to claim 6, wherein
- the vehicle carrying board is configured with a first photocoupler, the rotating shaft is fixedly connected to a sensing sheet;
- the pushing rod is configured to stop driving the swinging member to rotate, and the plurality of pedals are extended to be coplanar with the vehicle carrying board, when the sensing sheet is rotated along with the rotating shaft till being sensed by the first photocoupler.

8. The combined transporter according to claim 6, wherein
- an aligning sensor is configured at an end portion of the vehicle carrying board for the sub-transporter to move out and move in;
- the aligning sensor is configured to detect whether the vehicle carrying board is align to the parking spot by comparing an altitude of the vehicle carrying board and an altitude of the parking spot;
- the aligning sensor is configured to adjust the altitude of the vehicle carrying board in response to the vehicle carrying board misaligning to the parking spot; and
- the aligning sensor is configured to control the plurality of pedals to connect to the parking spot in response to the vehicle carrying board aligning to the parking spot.

9. The combined transporter according to claim 3, wherein
- the vehicle carrying board is configured with a second photocoupler and a third photocoupler;
- the second photocoupler is disposed at an end of the vehicle carrying board and configured to detect the sub-transporter moving out of and moving into the vehicle carrying board; and
- the third photocoupler is disposed along a diagonal line of the vehicle carrying board and configured to detect whether the sub-transporter is carried on the vehicle carrying board.

10. A master transporter, comprising:
- a vehicle transferring cart, comprising a bottom support and two side supports connected to two opposite sides of the bottom support;
- an elevating assembly, configured on the bottom support and between the two side supports, wherein the elevating assembly is slidably connected to the two side supports, and the elevating assembly is configured to elevate up and lower down along a direction perpendicular to a main surface of the bottom support and limited by the two side supports, and the main surface of the bottom support is a surface for supporting the elevating assembly,
- wherein the elevating assembly comprises:
  - a base board, disposed on the bottom support;
  - a vehicle carrying board, stacked on the base board and configured to support the sub-transporter; and
  - an elevating mechanism, disposed between the base board and the vehicle carrying board,
- wherein the elevating mechanism comprises:
  - a first foldable shelf, wherein a first end of the first foldable shelf is hinged to the base board, and a second end of the first foldable shelf slidably connects to the vehicle carrying board and supports the vehicle carrying board; and
  - a second foldable shelf, wherein a first end of the second foldable shelf is hinged to the vehicle carrying board, and a second end of the second foldable shelf slidably connects to and is supported by the base board, and a middle portion of the first foldable shelf is hinged to a middle portion of the second foldable shelf; and
  - a driving mechanism, configured to change an intersection angle between the first foldable shelf and the second foldable shelf to drive the vehicle carrying board to elevate up and lower down relative to the base board.

11. The master transporter according to claim 10, further comprising a plurality of moving mechanisms and a plurality of load wheels, wherein
- the plurality of moving mechanisms are at least disposed at four corners of the vehicle transferring cart respectively and configured to drive the vehicle transferring cart to move and redirect the vehicle transferring cart without changing a pose of the vehicle transferring cart; and
- the plurality of load wheels are disposed on the bottom support and configured to support the vehicle transferring cart while the vehicle transferring cart is moving.

12. The master transporter according to claim 11, further comprising:
- a plurality of distance detectors, disposed at a periphery of the vehicle transferring cart and configured to detect a distance between the master transporter and an obstacle to adjust moving paths of the plurality of moving mechanism;
- at least two visual detectors, disposed on the two side supports respectively and configured to detect spatial information in front of the two side supports correspondingly to adjust the moving paths of the plurality of moving mechanism; and
- a laser positioning sensor, disposed on a top of each of the two side supports away from the bottom support and configured to determine a location of the master transporter while the master transporter is cruising.

13. The master transporter according to claim 10, wherein each of two sides of the two side supports facing each other is configured with a first guide element, the vehicle carrying board is configured with a second guide element corresponding to the first guide element, the second guide element is slidably connected to the first guide element, and the vehicle carrying board elevates up and lower down along an extending direction of the first guide element, the extending direction is perpendicular to the main surface of the bottom support.

14. The master transporter according to claim 10, wherein the bottom support is connected to a wiring encoder, and the vehicle carrying board is connected to a wiring base, a wire of the wiring encoder is connected to the wiring base, and the wiring encoder is configured to detect an elevation altitude of the vehicle carrying board.

15. The master transporter according to claim 10, wherein an aligning sensor is configured at each of an end portion of the vehicle carrying hoard for the sub-transporter to move in and an end portion of the vehicle carrying board for the sub-transporter to move out;
the aligning sensor is configured to detect whether the vehicle carrying board is aligned to the parking spot by comparing the altitude of the vehicle carrying board and the altitude of the parking spot; and
the altitude of the vehicle carrying hoard is adjusted in response to the vehicle carrying board not aligning to the parking spot.

16. The master transporter according to claim 10, wherein the elevating assembly further comprises a bridging mechanism configured at an end portion of the vehicle carrying board, and the bridging mechanism comprises:
a rotating shaft, rotatably configured with the vehicle carrying board;
a plurality of pedals, fixedly connected to the rotating shaft and configured to form a bridge between the vehicle carrying board and the parking sport;
a swinging member, fixedly connected to the rotating shaft; and
a pushing rod, wherein two ends of the pushing rod are hinged to the swinging member and the vehicle carrying board respectively,
wherein the pushing rod drives the swinging member to rotate around an axis of the rotating shaft to drive the plurality of pedals to rotate around the axis of the rotating shaft.

17. The master transporter according to claim 16, wherein each of the two side supports defines a receiving space;
the master transporter further comprises a battery, a power source, and a control system;
the battery and the control system are received in the receiving space defined in one of the two side supports;
the power source is received in the receiving space defined in the other one of the two side supports;
the battery is configured to supply power to the master transporter;
the power source is configured to provide power to the driving mechanism and the pushing rod; and
the control system is configured to control the vehicle transferring cart to move and control the elevating assembly to elevate up and lower down.

18. The master transporter according to claim 17, wherein the bottom support is configured with a first recharging connector;
the battery is configured to supply power to the first recharging connector;
a side of the vehicle carrying board facing the bottom support is configured with a second recharging interface;
a side of the vehicle carrying board away front the bottom support is configured with a sub-transporter positioning member;
the sub-transporter positioning member is connected to the second recharging interface;
the sub-transporter positioning member is configured to supply power to the sub-transporter,
wherein the second recharging interface is electrically connected to the first recharging interface in response to the vehicle carrying board is stacked on the base board.

* * * * *